United States Patent [19]
Ikeda

[11] Patent Number: 5,644,567
[45] Date of Patent: Jul. 1, 1997

[54] LINE SWITCHING METHOD AND LINE SWITCHING APPARATUS

[75] Inventor: Yoshihisa Ikeda, Osaka, Japan

[73] Assignee: Fujitsu Limited, Kanagawa, Japan

[21] Appl. No.: 432,514

[22] Filed: May 1, 1995

[30] Foreign Application Priority Data

Aug. 3, 1994 [JP] Japan ................... 6-182642

[51] Int. Cl.$^6$ ................................. H04J 1/16
[52] U.S. Cl. ................ 370/225; 370/252; 371/5.5
[58] Field of Search ..................... 370/16, 58.1, 84, 370/99, 105.3, 13, 14, 110.1, 17; 375/371; 371/5.1, 5.5

[56] References Cited

U.S. PATENT DOCUMENTS

| | | | |
|---|---|---|---|
| 4,953,180 | 8/1990 | Fieschi et al. | 370/84 |
| 5,040,170 | 8/1991 | Upp et al. | 370/84 |
| 5,323,397 | 6/1994 | Kurotsu | 370/105.3 |

FOREIGN PATENT DOCUMENTS

| | | | |
|---|---|---|---|
| 2-193430 | 7/1990 | Japan | H04L 7/00 |
| 2-272925 | 11/1990 | Japan | H04J 3/06 |
| 3-201840 | 9/1991 | Japan | H04L 1/22 |
| 4-326219 | 11/1992 | Japan | H04J 3/07 |
| 5-75562 | 3/1993 | Japan | H04J 3/07 |
| 5-153103 | 6/1993 | Japan | H04L 7/00 |

*Primary Examiner*—Douglas W. Olms
*Assistant Examiner*—Shick Hom

[57] ABSTRACT

A line switching method and apparatus for switching multiplex transmission lines to select, for each of channels of transmission data transmitted in the lines, one of the lines in accordance with line alarm information in the transmission data of the channel, have a pointer value detection function, an alarm detection supervision function and a line switching function for time division multiplexed data of digital signals which are processed serially. The line switching apparatus includes a serial processing circuit provided for each line for detecting line alarm information of the channels by serial processing, and a line switching circuit for switching, for the channels, the lines in a time series relationship in response to the results of detection by the serial processing circuits. Each serial processing section includes a pointer frame top position detection circuit for detecting frame top positions of the channels in multiplexed transmission data from pointer information by serial processing, and a line alarm detection circuit for detecting line alarm information of the channels by serial processing in accordance with the results of detection by the pointer frame top position detection circuit.

16 Claims, 15 Drawing Sheets

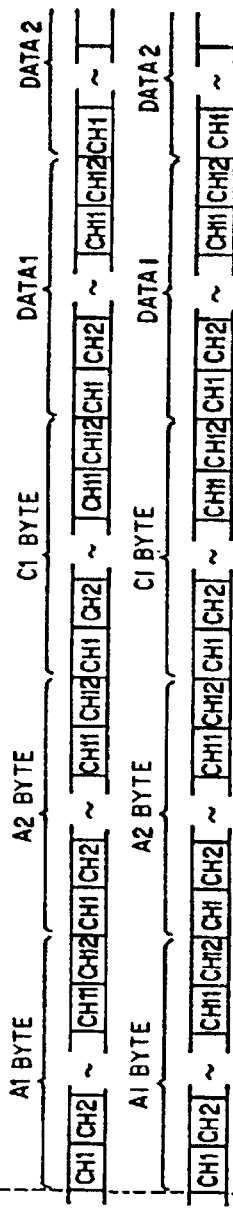
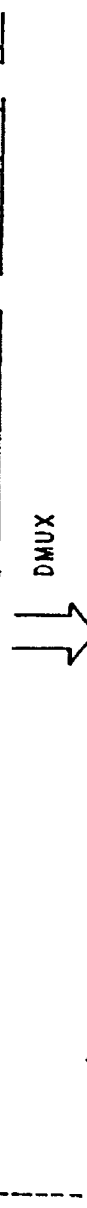
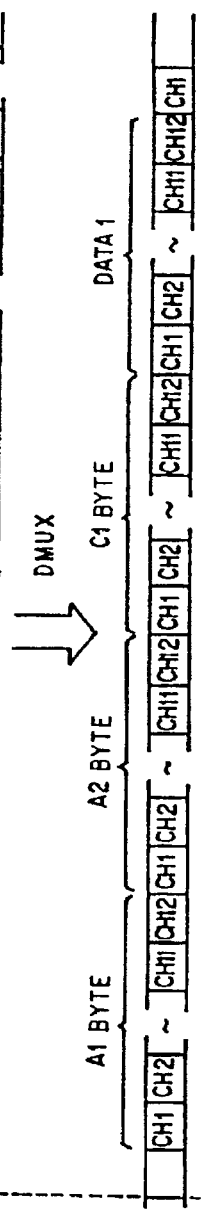
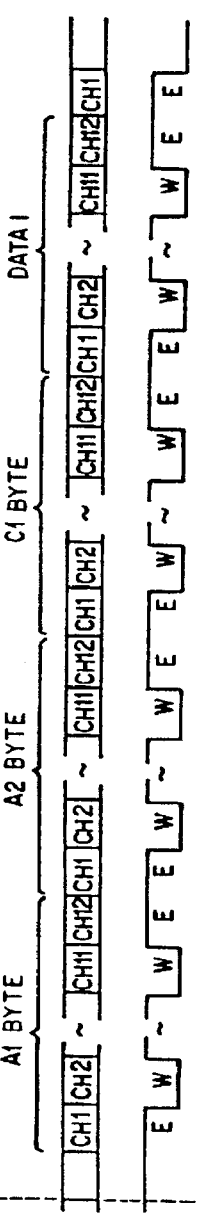
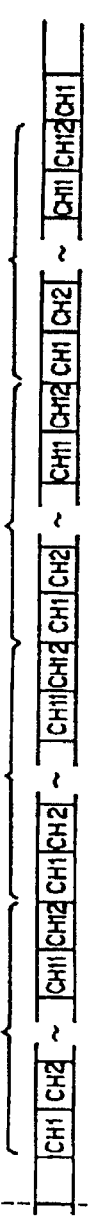
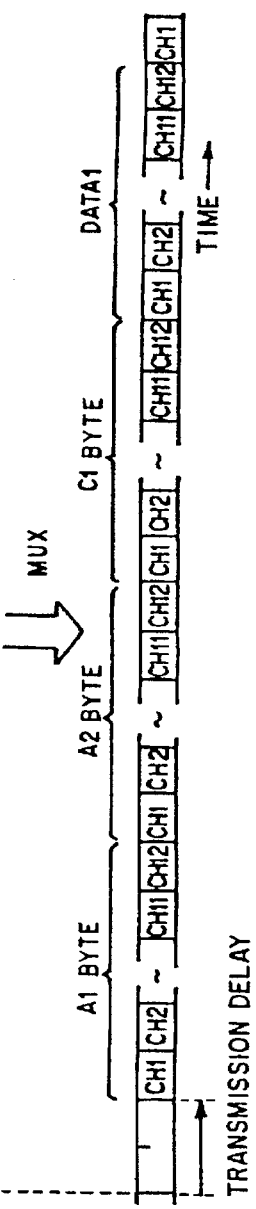

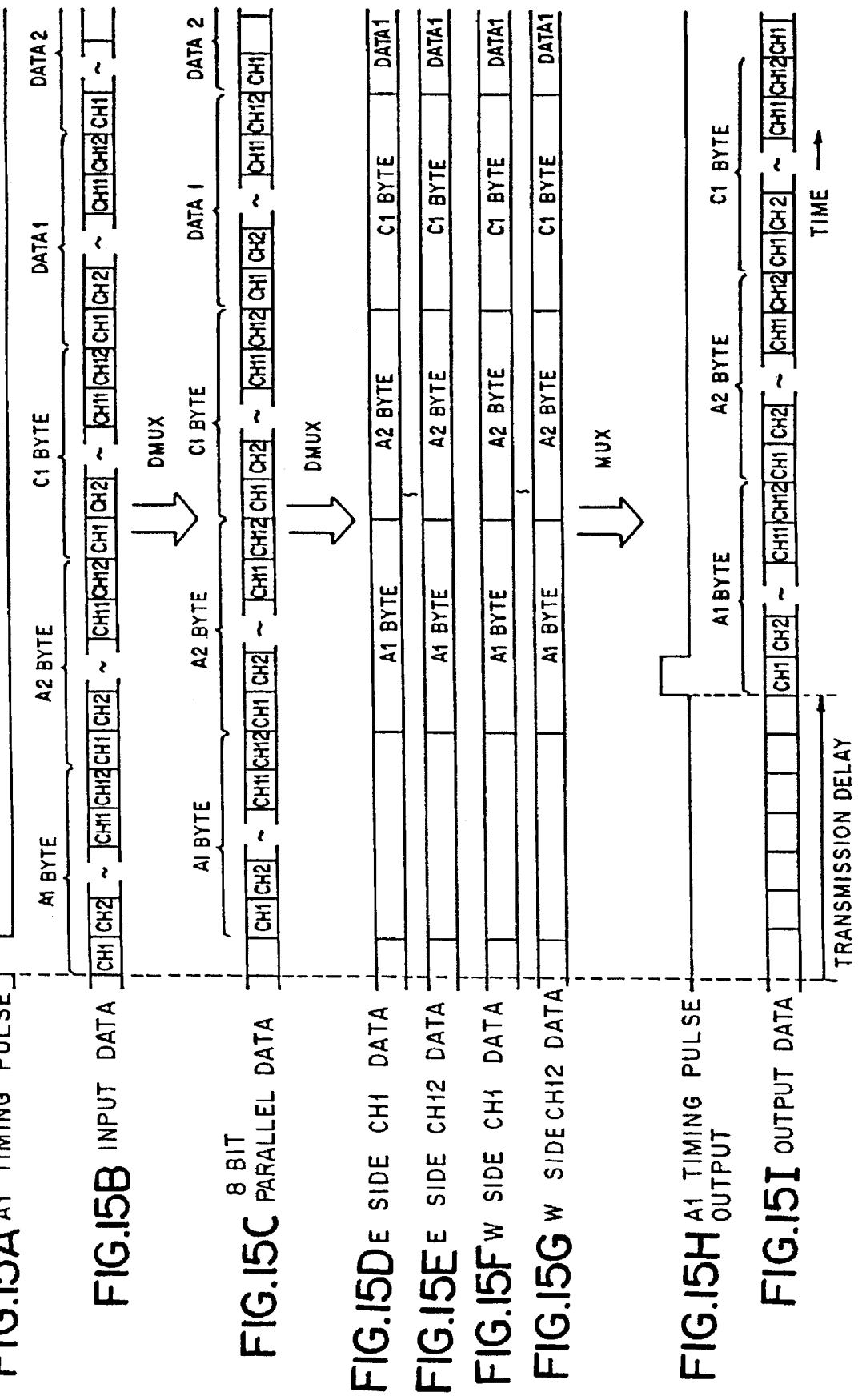

LINE SWITCHING METHOD AND LINE SWITCHING APPARATUS

BACKGROUND OF THE INVENTION

1. Field of the Invention

This invention relates to a line switching method and a line switching apparatus for switching a plurality of multiplex transmission lines to select, for each of channels of transmission data transmitted in the multiplex transmission lines, one of the multiplex transmission lines in accordance with line alarm information in the transmission data of the channel.

2. Description of the Related Art

In such a time division multiplexed transmission system for digital signals as shown in FIG. 13, each node apparatus 200 detects a transmission trouble or an apparatus trouble to select a transmission line of a better transmission quality and thus switch the currently used line from a service line 201-1 to a protection line 201-2 or reversely, from the protection line 201-2 to the service line 201-1 in order to continue the service.

In order to switch lines for each channel of multiplexed transmission data, it is necessary to detect a pointer value of the channel or frame top and detect trouble information to supervise the lines in units of a channel.

FIG. 14 shows a construction of a line switching apparatus. Referring to FIG. 14, input data E (EASTs) SIDE DATA IN are inputted to a service line 201-1, and input data W (WEST) SIDE DATA IN are inputted to a protection line 201-2.

The line switching apparatus includes a DMUX section (demultiplexing section) 111 for demultiplexing serial data into parallel data of 8 bits, and another DMUX section 112 for demultiplexing multiplexed data into data in units of a channel. The DMUX sections 111 and 112 are provided for each of the service line 201-1 and the protection line 201-2.

The line switching apparatus further includes a channel processing section 113 provided for each of the E (EAST) side and the W (WEST) side. Each of the channel processing sections 113 includes a pointer value detection circuit 114 for a single channel, a top byte detection circuit 115 for the single channel, and an alarm detection circuit 116 for detecting various alarms (m alarms in the arrangement shown in FIG. 14) of the single channel. The line switching apparatus further includes a plurality of priority checking sections 117 provided for the individual channels for supervising m alarms on the E (EAST) side and m alarms on the W (WEST) side in a predetermined priority order to select, for each of the channels, a line having a better line quality, and a plurality of selectors 118 provided for the individual channels for switching, for each of the channels, the currently used line to a line having a better line quality.

The line switching apparatus further includes a MUX section (multiplexing section) 119 for converting demultiplexed data back into multiplexed data.

In the line switching apparatus of the construction described above, E side data of the service line 201-1 and W side data of the protection line 201-2 are expanded parallelly to data of the individual channels by the DMUX sections 111 and 112. The data of each channel are supplied to a corresponding one of the channel processing sections 113, in which a pointer is subsequently detected from the data by the pointer detection circuit 114 and then a top byte is detected by the top byte detection circuit 115, whereafter the m alarms are detected from the data by the alarm detection circuit 115.

Then, the E side data and the W side data are compared with each other for each of the corresponding channels by a corresponding one of the priority checking sections 117, and a corresponding one of the selectors 118 is switched in response to a result of the comparison by the priority checking section 118 to select a line having a better line quality. Thereafter, the demultiplexed data are converted back into original multiplexed data by the MUX section 119.

However, in line switching by the node apparatus described above, since multiplexed transmission data are demultiplexed in units of a channel and detection of a pointer, supervision for detection of alarms and switching of lines are processed parallelly for the individual channels, a plural number of processing sections, which have a same function, equal to the number of channels are required. This makes the scale of the apparatus large and requires a high cost accordingly.

Further, in the line switching apparatus described above, a large amount of a transmission delay results due to its parallel processing also, as can be seen from a STM-4 (STY: Synchronous Transfer Mode) shown in waveforms (a) to (i) of FIG. 15.

It is to be noted that reference characters (a) to (i) in FIG. 15 correspond to reference characters (a) to (i) in FIG. 14.

Further, since line switching at a low order group level wherein a large number of channels are involved cannot be performed by a high order group interface, the line switching apparatus has another problem to be solved in that expansion of the service to a general purpose apparatus cannot be achieved.

SUMMARY OF THE INVENTION

It is an object of the present invention to provide a line switching method and a line switching apparatus wherein a pointer detection function, an alarm detection supervision function and a line switching function for time division multiplexed data of digital signals are processed serially and processing for a plurality of channels can be realized in a small scale and at a low cost.

It is another object of the present invention to provide a line switching method and a line switching apparatus by which expansion of the service is allowed by processing multiplexed data of a low order group.

In order to attain the objects described above, according to an aspect of the present invention, there is provided a line switching method for switching a plurality of multiplex transmission lines in response to line alarm information in transmission data of individual channels transmitted in the multiplex transmission lines so as to select, for each of the channels, one of the multiplex transmission lines, comprising the steps of detecting, for each of the multiplex transmission lines, frame top positions of the individual channels in the multiplexed transmission data by serial processing from pointer information, detecting, in accordance with results of detection of the frame top positions, line alarm information of the individual channels by serial processing, and switching the multiplex transmission lines in a time series relationship for the individual channels in accordance with the results of detection of the line alarm information for the individual multiplex transmission lines.

According to another aspect of the present invention, there is provided a line switching apparatus for switching a plurality of multiplex transmission lines in response to line alarm information in transmission data of individual channels transmitted in the multiplex transmission lines so as to select, for each of the channels, one of the multiplex transmission lines, comprising a serial processing section provided for each of the multiplex transmission lines for detecting line alarm information of the individual channels by serial processing, and a line switching section for switching, for the individual channels, the multiplex transmission lines in a time series relationship in response to the results of detection of the serial processing sections, each of the serial processing sections including a pointer frame top position detection section for detecting frame top positions of the individual channels in the multiplexed transmission data from pointer information by serial processing, and a line alarm detection section for detecting line alarm information of the individual channels by serial processing in accordance with the results of detection by the pointer frame top position detection section.

With the line switching method and the line switching apparatus, since the frame top positions of individual channels of multiplexed transmission data are detected by serial processing from pointer information and, also line alarms of the individual channels are detected serially, supervision of line qualities and switching of the lines can be performed commonly for the channels, and consequently, the transmission delay can be reduced. In particular, even if the transmission capacity for multiplexed data increases, the scale of the apparatus construction is still reduced and the construction itself is simplified and besides the transmission delay can be reduced, which is very advantageous in a digital multiplex transmission system. Further, although low order group data usually involve a comparatively great number of channels, where the line switching apparatus of the present invention is employed, since it is required to prepare only a number of alarm detection systems equal to the number of lines, line switching at a low order group level can be realized readily. Consequently, expansion of the service to a general purpose apparatus can be achieved.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIG. 12 is a time chart illustrating a transmission delay of the line switching apparatus shown in FIG. 2;

FIG. 15 is a time chart illustrating a transmission delay of the line switching apparatus shown in FIG. 14.

DESCRIPTION OF THE PREFERRED EMBODIMENT

I. Aspects of the Invention

Figure 1:
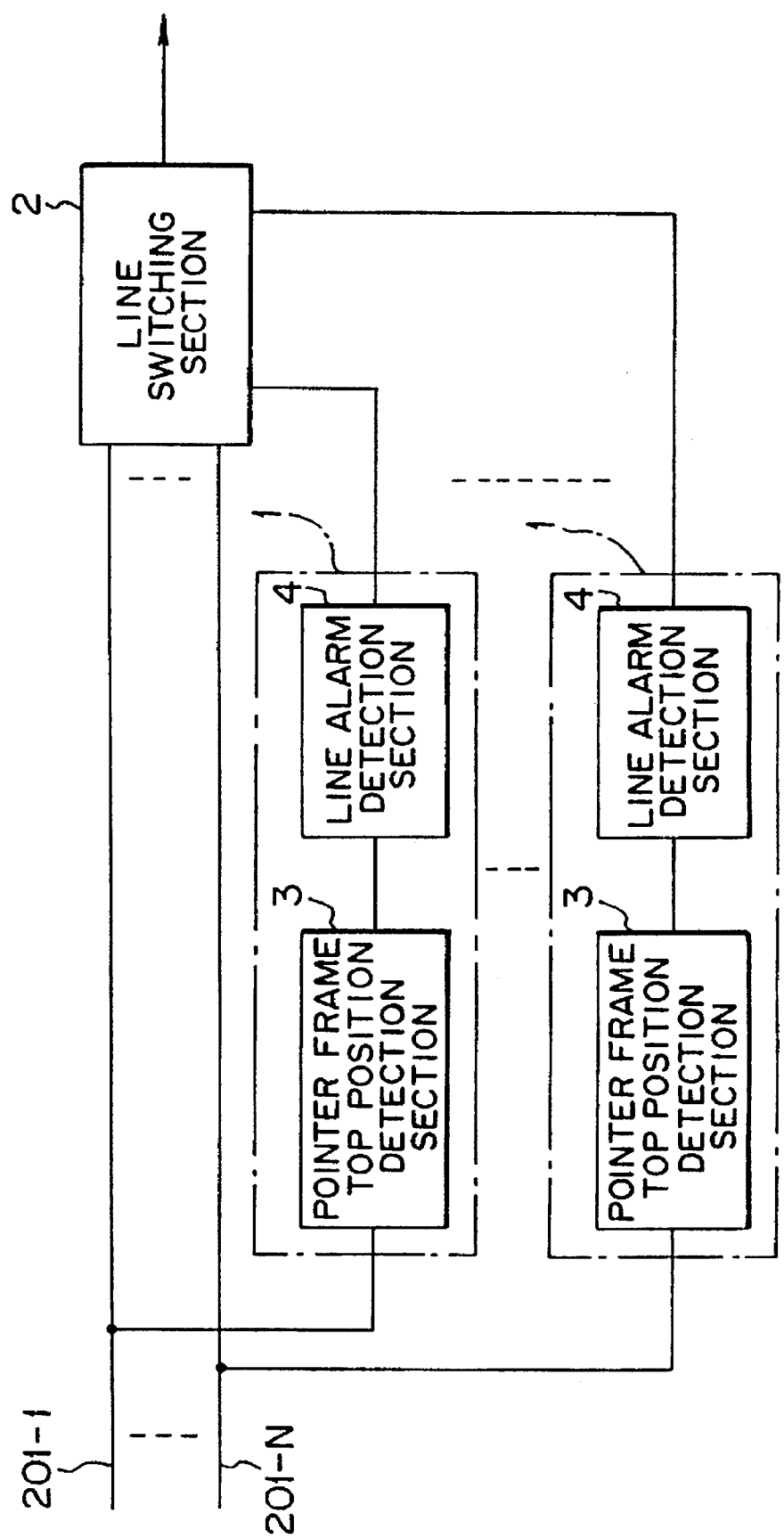
FIG. 1 is a block diagram illustrating an aspect of the present invention.

According to the present invention, a line switching method is used to switch a plurality of multiplex transmission lines in response to line alarm information in transmission data of individual channels transmitted in the multiplex transmission lines so as to select, for each of the channels, one of the multiplex transmission lines, and comprises the steps of:

1. detecting, for each of the multiplex transmission lines, frame top positions of the individual channels in the multiplexed transmission data by serial processing;
2. detecting, in accordance with results of detection of the frame top positions, line alarm information of the individual channels by serial processing; and
3. switching the multiplex transmission lines in a time series relationship for the individual channels in accordance with results of detection of the line alarm information for the individual multiplex transmission lines.

Accordingly, in the line switching method of the present invention, for each of the multiplex transmission lines, the frame top positions of the individual channels in the multiplexed transmission data are first detected by serial processing from pointer information. Then, in accordance with the results of detection of the frame top positions, line alarm information of the individual channels is detected by serial processing, and thereafter, the multiplex transmission lines are switched in a time series relationship for the individual channels in accordance with the results of detection of the line alarm information for the individual multiplex transmission lines.

In this instance, the line switching method may be constructed such that specific addresses are allocated to the individual channels of the multiplexed transmission data, and stored pointer values are sent out in a time series relationship in synchronism with the addresses and then compared with counter values indicating offset positions of pointers to detect the frame top positions in a time series relationship at the address positions beginning with arbitrary positions of payload envelopes. Here, the pointer values to be compared with the counter values may be processed by stuff control to update the pointer values in a time series relationship thereby to detect the frame top positions by serial processing. Further, when the stuff control is to be performed, it may be detected at negative stuff byte positions whether or not the pointer values should be increased or decreased.

Or, the line switching method may be constructed such that parity information of the individual channels of the multiplexed transmission data is detected in a time series relationship beginning with the frame top positions and parity calculations of the individual cannels of the multiplexed transmission data are performed in a time series relationship beginning with the frame top positions, and from the thus obtained parity information and parity calculation information, parity error information is detected in a time series relationship to detect line alarm information of the individual channels by serial processing.

Else, line alarm information of the individual channels may be detected in a time series relationship in timer periods of error rates set for the individual channels. In this instance, when an actual line error rate is higher than a set supervision error rate, detection of the line alarm information may be performed at the actual line error rate.

An apparatus with which the line switching method of the present invention is performed will be described below.

FIG. 1 shows the line switch apparatus according to the present invention. Referring to FIG. 1, the line switching apparatus includes a serial processing section 1 provided for each of a plurality of multiplex transmission lines 201-1 to 201-N (N is an integer equal to or greater than 2). Each of the serial processing sections 1 detects, for the corresponding multiplex transmission line 201-i (i is a natural number), line alarm information of individual channels by serial processing.

The line switching apparatus further includes a line switching section 2 which switches, for the individual channels, the multiplex transmission lines 201-1 to 201-N in a time series relationship in response to results of detection by the serial processing sections 1.

Each of the serial processing sections 1 includes a pointer frame top position detection section 3 for detecting frame top positions of the individual channels in multiplexed transmission data from pointer information by serial processing, and a line alarm detection section 4 for detecting line alarm information of the individual channels by serial processing in accordance with results of detection by the pointer frame top position detection section 3.

Though not shown, the pointer frame top position detection section 3 includes a pointer detection section for detecting pointer information by serial processing, and a frame top position detection section for detecting the frame top positions of the individual channels in multiplexed transmission data by serial processing from pointer information detected by the pointer detection section.

The pointer detection section may include a pointer value storage section for storing pointer values at specific addresses allocated to the individual channels of the multiplexed transmission data, and the frame top position detection section may include an offset counter for indicating offset positions of the pointers, and a comparison section for comparing the pointer values sent out in a time series relationship in synchronism with the addresses from the pointer value storage section with counter values from the offset counter to detect the frame top positions in a time series relationship to the address positions from arbitrary positions of payload envelopes.

Further, the pointer value storage section may be constituted from a RAM, and the pointer detection section may further include a stuff control section for performing stuff control for the pointer values to be compared with the counter values, the pointer values in the pointer value storage section being updated in a time series relationship by the stuff control by the stuff control section.

Furthermore, the stuff control section may include a pointer value increment/decrement detection section for detecting at negative stuff byte positions whether the pointer values should be incremented or decremented, and a storage section for storing the pointer information may serve also as a positive stuff detection information storage section for storing positive stuff detection information.

Meanwhile, the line alarm detection section 4 may include a parity detection section for detecting parity information of the individual channels of the multiplexed transmission data from the frame top positions in a time series relationship, a parity calculation section for performing parity calculations of the individual channels of the multiplexed transmission data from the frame top positions in a time series relationship, and a parity error detection section for detecting parity error information in a time series relationship from the parity information and the parity calculation information obtained by the parity detection section and the parity calculation section, respectively, to detect line alarm information of the individual channels by serial processing.

Or, the line alarm detection section 4 may detect line alarm information of the individual channels in a time series relationship in timer periods of error rates set for the individual channels. In this instance, the line alarm detection section 4 may perform, when an actual line error rate is higher than a set supervision error rate, detection of the line alarm information at the actual line error rate.

Subsequently, operation of the line switching apparatus will be described.

In particular, each of the serial processing sections 1 detects, for the corresponding multiplex transmission line 201-i, line alarm information of individual channels by serial processing. In this instance, in the serial processing section 1, the pointer frame top position detection section 3 detects frame top positions of the individual channels in multiplexed transmission data from pointer information by serial processing, and the line alarm detection section 4 detects line alarm information of the individual channels by serial processing in accordance with results of the detection by the pointer frame top position detection section 3.

Then, the line switching section 2 switches, for the individual channels, the multiplex transmission lines 201-1 to 201-N in a time series relationship in response to results of such detection as described above by the serial processing sections 1.

Where the pointer frame top position detection section 3 includes a pointer detection section and a frame top position detection section, the pointer detection section detects pointer information by serial processing, and the frame top position detection section detects the frame top positions of the individual channels in the multiplexed transmission data by serial processing from the pointer information detected by the pointer detection section.

Where the pointer detection section includes a pointer value storage section and the frame top position detection section includes an offset counter and a comparison section, the pointer value storage section of the pointer detection section stores pointer values at peculiar addresses allocated to the individual channels of the multiplexed transmission data, and the comparison section of the frame top position detection section compares the pointer values sent out in a time series relationship in synchronism with the addresses from the pointer value storage section with counter values from the offset counter to detect the frame top positions in a time series relationship to the address positions from arbitrary positions of payload envelopes.

Where the pointer detection section includes a stuff control section, the pointer values in the pointer value storage section (RAM) may be updated in a time series relationship by stuff control by the stuff control section.

Further, a storage section for storing the pointer information may serve also as a positive stuff detection information storage section for storing positive stuff detection information.

Where the line alarm detection section 4 includes a parity detection section, a parity calculation section and a parity error detection section, the parity detection section detects parity information of the individual channels of the multiplexed transmission data from the frame top positions in a time series relationship, and the parity calculation section performs parity calculations of the individual channels of the multiplexed transmission data from the frame top positions in a time series relationship. Then, the parity error detection section detects parity error information in a time series relationship from the parity information and the parity calculation information obtained by the parity detection section and the parity calculation section, respectively, to detect line alarm information of the individual channels by serial processing.

Or, the line alarm detection section 4 may detect line alarm information of the individual channels in a time series relationship in timer periods of error rates set for the individual channels. In this instance, the line alarm detection section 4 may perform, when an actual line error rate is higher than a set supervision error rate, detection of the line alarm information at the actual line error rate.

With the line switching method and the line switching apparatus of the present invention, the following effects or advantages can be achieved:

1. Since the frame top positions of individual channels of multiplexed transmission data are detected by serial processing from pointer information and also line alarms of the individual channels are detected serially, supervision of line qualities and switching of the lines can be performed commonly for the channels, and consequently, the transmission delay can be reduced. In particular, even if the transmission capacity for multiplexed data increases, the scale of the apparatus construction is still reduced and the construction itself is simplified and besides the transmission delay can be reduced, which is very advantageous with a digital multiplex transmission system. Further, although low order group data usually involve a comparatively great number of channels, where the line switching apparatus of the present invention is employed, since it is required to prepare only a number of alarm detection systems equal to the number of lines, line switching at a low order group level can be realized readily. Consequently, expansion of the service to a general purpose apparatus can be achieved.

2. Where, upon detection of pointers, specific addresses are allocated to individual channels of multiplexed data and stored pointer values are sent out in a time series relationship in synchronism with the addresses and compared with counter values indicating offset positions of the pointers, the top byte positions can be detected in a time series relationship from arbitrary portions of payload envelopes to the address positions.

3. Serial processing can be realized by storing pointer values using a RAM and performing updating of the pointer values and stuff control in a time series relationship.

4. Where, upon stuff control, detection of increment or decrement of a pointer value is performed at a negative stuff byte position, a storage section for pointer value decrement information is unnecessary, and the circuit construction can be simplified.

5. Where a storage section for storing pointer information serves also as a positive stuff detection information storage section for storing positive stuff detection information, the circuit construction can be further reduced in size.

6. Where parity bytes of individual channels of multiplexed data are detected in a time series relationship beginning with frame top byte positions and parity calculations of the individual channels of the multiplexed data are performed in a time series relationship beginning with the frame top byte positions, parity errors can be detected in a time series relationship.

7. In supervision for line alarms, errors can be supervised in a time series relationship in time periods of error rates set arbitrarily for individual channels. Further, in supervision for line alarms, when an actual line error rate is higher than a set supervision error rate, an alarm may be detected at the actual line error rate, which is practical.

II. Embodiment a. General Construction

Figure 2:
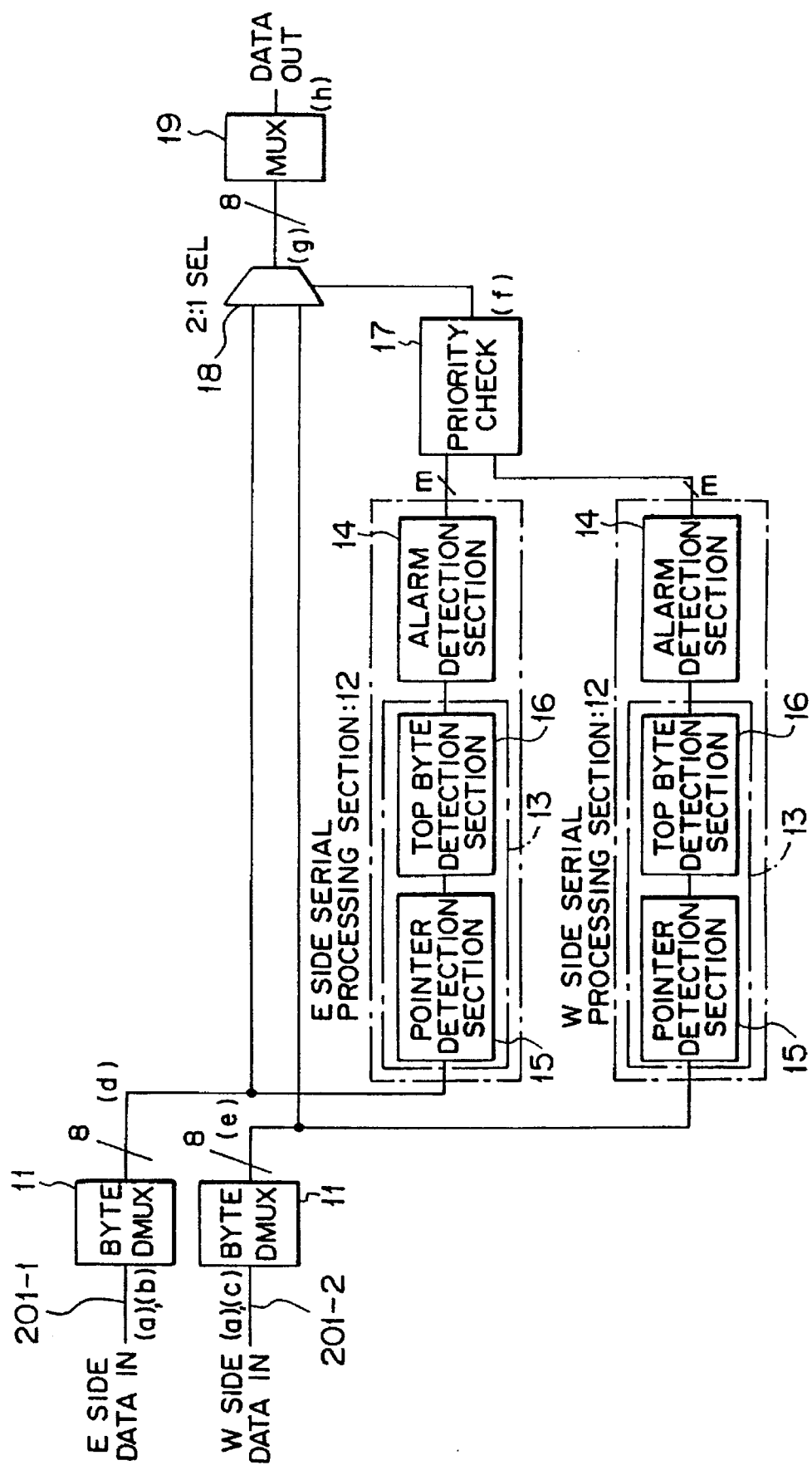
FIG. 2 is a block diagram of a line switching apparatus showing a preferred embodiment of the present invention.

Referring now to FIG. 2, there is shown a general construction of a line switching apparatus according to a preferred embodiment of the present invention. The line switching apparatus is provided in a node apparatus and includes a DMUX section 11 provided for each of a service line 201-1 (E SIDE DATA IN) and a protection line 201-2 (W SIDE DATA IN) as multiplex transmission lines for demultiplexing serial data into parallel data of 8 bits (1 byte).

The line switching apparatus includes a pair of serial processing sections 12 for the E side and the W side. The serial processing sections 12 perform serial processing to detect line alarm information for individual channels for the individual lines (multiplex transmission lines) 201-1 and 201-2.

Each of the serial processing sections 12 includes a pointer top byte detection section (pointer frame top position detection section) 13 for detecting top bytes having frame top position information of the individual channels in multiplexed transmission data by serial processing from pointer information, and an alarm detection section 14 for detecting line alarm information (which may be hereinafter referred to merely as alarm or alarms) of the individual channels by serial processing in accordance with results of detection by the pointer top byte detection section 13.

The pointer top byte detection section 13 includes a pointer detection section 15 and a top byte detection section 16.

The pointer detection section 15 serially detects pointer values of the individual channels of multiplexed data. The top byte detection section 16 detects top bytes of the individual channels from pointer values detected by the pointer detection section 15.

The alarm detection section 14 detects various alarms (m alarms in the arrangement shown in FIG. 2) based on frame top positions (top bytes) of the individual channels.

The line switching apparatus further includes a priority checking (PRIORITY CHECK) section 17 which supervises line qualities of the E side and the W side based on results of detection by the alarm detection section 14 and determines, for each of the channels, a line of a better line quality.

The line switching apparatus further includes a selector 18 for switching the currently used line to a line having a better line quality in accordance with an output of the priority checking section 17.

The priority checking section 17 and the selector 18 thus constitute a line switching section for switching, for the individual channels, the currently used lines between the multiplex transmission lines 201-1 and 201-2 in a time series relationship in accordance with results of detection by the serial processing sections 12.

The line switching apparatus further includes a MUX section 19 for converting demultiplexed data back into original multiplexed data.

The line switching apparatus having the construction described above operates in the following manner. In particular, each of the serial processing sections 12 detects line alarm information of the individual channels of a corresponding one of the multiplex transmission lines 201-1 and 201-2 by serial processing. In this instance, in each of the serial processing sections 12, the pointer frame top position detection section 13 detects, using the pointer detection section 15 and the top byte detection section 16 thereof, top bytes as frame top positions of the individual channels in multiplexed transmission data by serial processing from pointer information, and the alarm detection section 14 detects line alarm information of the individual channels by serial processing based on results of the detection by the pointer frame top position detection section 13.

Then, the priority checking section 17 outputs a control signal to the selector 18 in accordance with such results of detection by the serial processing sections 12, and in response to the control signal, the selector 18 switches the currently used lines between the service line 201-1 and protection line 201-2 in a time series relationship for the individual channels.

Figure 14:
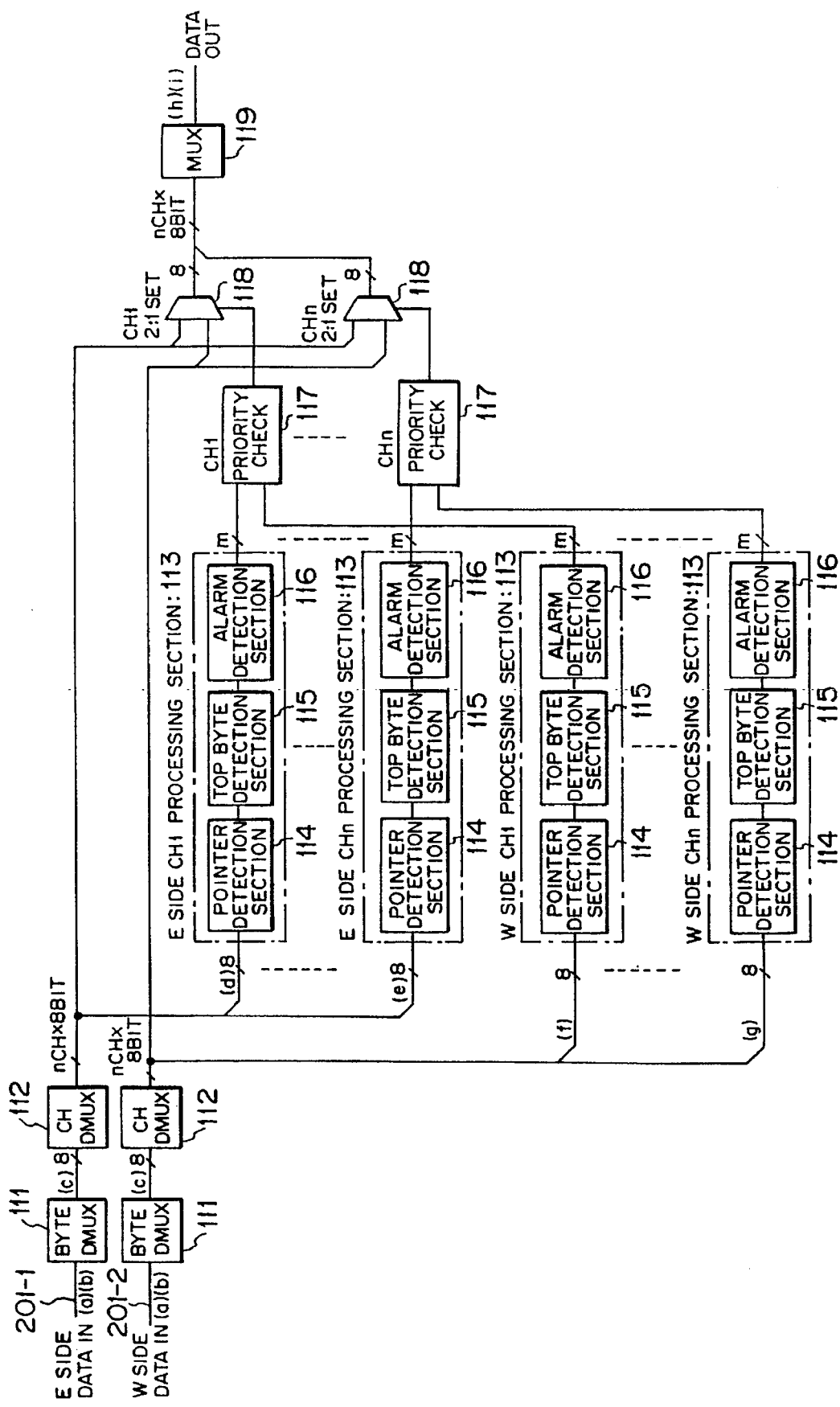
FIG. 14 is a block diagram showing a construction of a line switching apparatus.

In this manner, while several detection processing sections are conventionally required by a number equal to the number of channels for each of the E side and the W side (refer to reference numeral 113 in FIG. 14), due the serial processing by the pointer detection section 15, the top byte detection section 16 and the alarm detection section 14 described above, the line switching apparatus can be constituted from only two detection processing sections of the E side serial processing section 12 and the W side serial processing section 12. This allows the line switching apparatus to include a single succeeding processing section, i.e., the priority checking section 17 and a single selector, i.e., the selector 18 for switching the line.

A transmission delay of the present line switching apparatus based on the serial processing system when it is in the STM-4, can be seen from the waveforms (a) to (h) of FIG. 12. According to the present serial processing system, since channel-multiplexed data (12 channels are multiplexed in the example illustrated in FIG. 12) are processed in a time series relationship, it can be seen that the transmission delay by the DMUX sections 11 can be reduced (refer to the waveforms (a) to (h) of FIG. 12).

It is to be noted that the signals shown by the waveforms (a) to (h) in FIG. 12 are those at the locations indicated by reference characters (a) to (h) in FIG. 2, respectively.

b. Detection of Pointers and Top Bytes by Serial Processing

A procedure of detecting pointers and top bytes by serial processing will be described subsequently.

Figure 3:
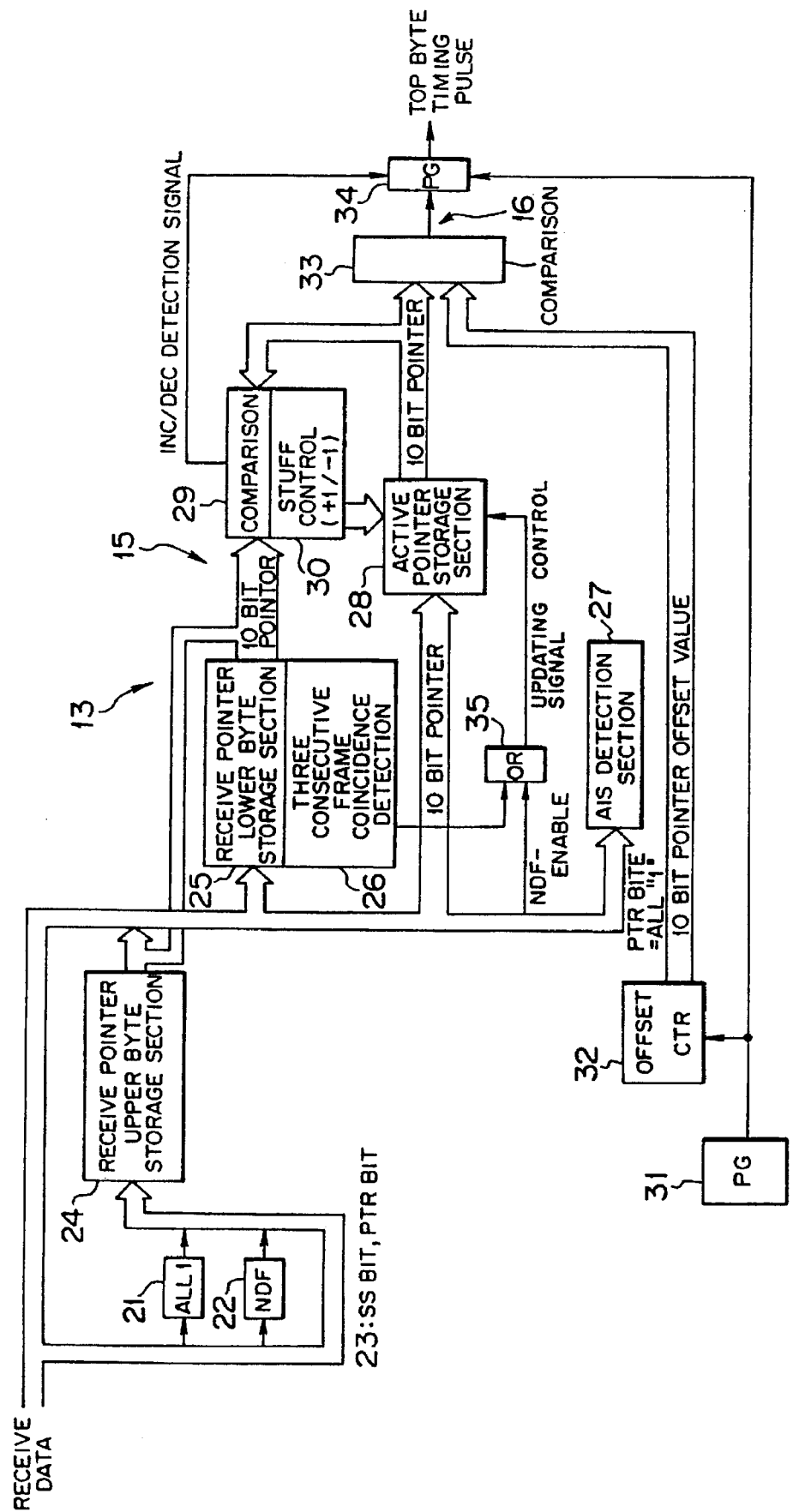
FIG. 3 is a block diagram showing a construction of a pointer frame top position detection section of the line switching apparatus of FIG. 2.

FIG. 3 shows a construction of a pointer frame top position detection section for realizing the procedure of detecting pointers and top bytes by serial processing. Referring to FIG. 3, the pointer frame top position detection section 13 shown includes a pointer detection section 15 and a top byte detection section 16. Specifically, the pointer frame top position detection section 13 includes an all-"1" (ALL 1) detection section 21, a NDF detection section 22, an upper byte storage section 24, a lower byte storage section 25, a three consecutive frame coincidence detection section 26, an AIS detection section 27, an active pointer (PTR) storage section 28, a comparison section 29, and a stuff control section 30 as well as a pulse generator (PG) 31, an offset counter (Offset CTR) 32, a comparison section 33, a timing production section 34 and so forth.

The all-"1" detection section 21 detects all-"1" of upper 8 bits of a pointer byte to detect an AIS (Alarm Indication Signal).

The NDF detection section 22 detects a NDF (New Data Flag) and is used to update the pointer values.

It is to be noted that "SS bit" in FIG. 3 (refer to reference numeral 23) denotes a data size and indicates a frame of transmission data, and "PTR bit" (refer to reference numeral 23) denotes upper 2 bits of a pointer.

The upper byte storage section 24 stores, for each of the channels, an upper byte (V1 byte or H1 byte) of a receive pointer and particularly stores AIS information, NDF information, SS bit(s), and upper two bits of the pointer mentioned hereinabove.

The lower byte storage section 2S stores, for each of the channels, a lower byte (V2 byte or H2 byte) of a receive pointer. The three consecutive frame coincidence detection section 26 detects whether or not an effective pointer value coincides among three consecutive frames and is used for protection against a reception error of a pointer.

The AIS detection section 27 detects an AIS from all-"1" of a pointer byte.

The active pointer storage section 28 receives, for each of the channels, as an updating control signal, a signal obtained from an OR gate 35 when a signal from the three consecutive frame coincidence detection section 26 and a NDF enable signal are inputted to the OR gate 35, and stores a current pointer value (value of a pointer which is operating actually: Active Pointer (ACT PTR)).

The comparison section 29 compares, for each of the channels, a receive pointer value from the upper byte storage section 24 and the lower byte storage section 25 with a current pointer value from the active pointer storage section 28 and detects pointer value increment (Increment (INC)) or pointer value decrement (Decrement (DEC)) by means of a majority operation. The stuff control section 30 adds +1 or −1 (+1/−1) to the active pointer value (ACT PTR) of the active pointer storage section 28 when increment or decrement is detected by the comparison section 29.

The pulse generator 31 produces an over head (OVER HEAD) byte, a stuff (STUFF) byte and a timing for the offset counter 32.

Meanwhile, the offset counter 32 indicates a pointer offset value of a time slot of data.

The comparison section 33 detects the head positions of the individual channels. In particular, the comparison section 33 successively compares pointer values of the individual channels sent out serially from the active pointer storage section 28 with pointer offset values sent out serially from the offset counter 32. The positions at which coincidence is reached by the comparison are indicated as the top byte positions of the individual channels.

The timing production section 34 produces, for each of the channels, a timing for making effective only a SPE (Synchronous Payload Envelope) of data beginning with the top byte position obtained as a result of comparison by the comparison section 33.

In the pointer frame top position detection section 13 shown in FIG. 3, for each of the channels, an upper byte of a receive pointer (AIS information, NDF information, SS bit(s), and upper 2 bits of the pointer) is stored into the upper byte storage section 24 while a lower byte of the receive pointer is stored into the lower byte storage section 25. Further, current pointer values are stored in the active pointer storage section 28. In this instance, in response to a result of comparison by the comparison section 29, the stuff control section 30 increments or decrements the active pointer value (ACT PTR) of the active pointer storage section 28 by one (+1/−1).

The comparison section 33 compares pointer values of the individual channels sent out serially from the active pointer storage section 28 with the pointer offset values sent out serially from the offset counter 32 and indicates the positions, at which coincidence by the comparison is exhibited, as top byte positions of the individual channels. It is to be noted that the timing production section 34 makes effective only SPE portions beginning with the top byte positions obtained as a result of comparison by the comparison section 33. Consequently, top byte timing pulses are outputted from the timing production section 34.

As described above, since multiplexed data are processed, in each of the processing sections described above, in a time series relationship in synchronism with peculiar addresses allocated to the individual channels, top bytes can be detected in a time series relationship at the address positions beginning with arbitrary positions of the SPEs.

Subsequently, an example wherein updating of pointer values and serial processing of stuff control are realized using RAMs (Random Access Memories) for the pointer upper byte storage section 24, the pointer lower byte storage section 25 and the active pointer storage section 28 will be described.

Figure 4:
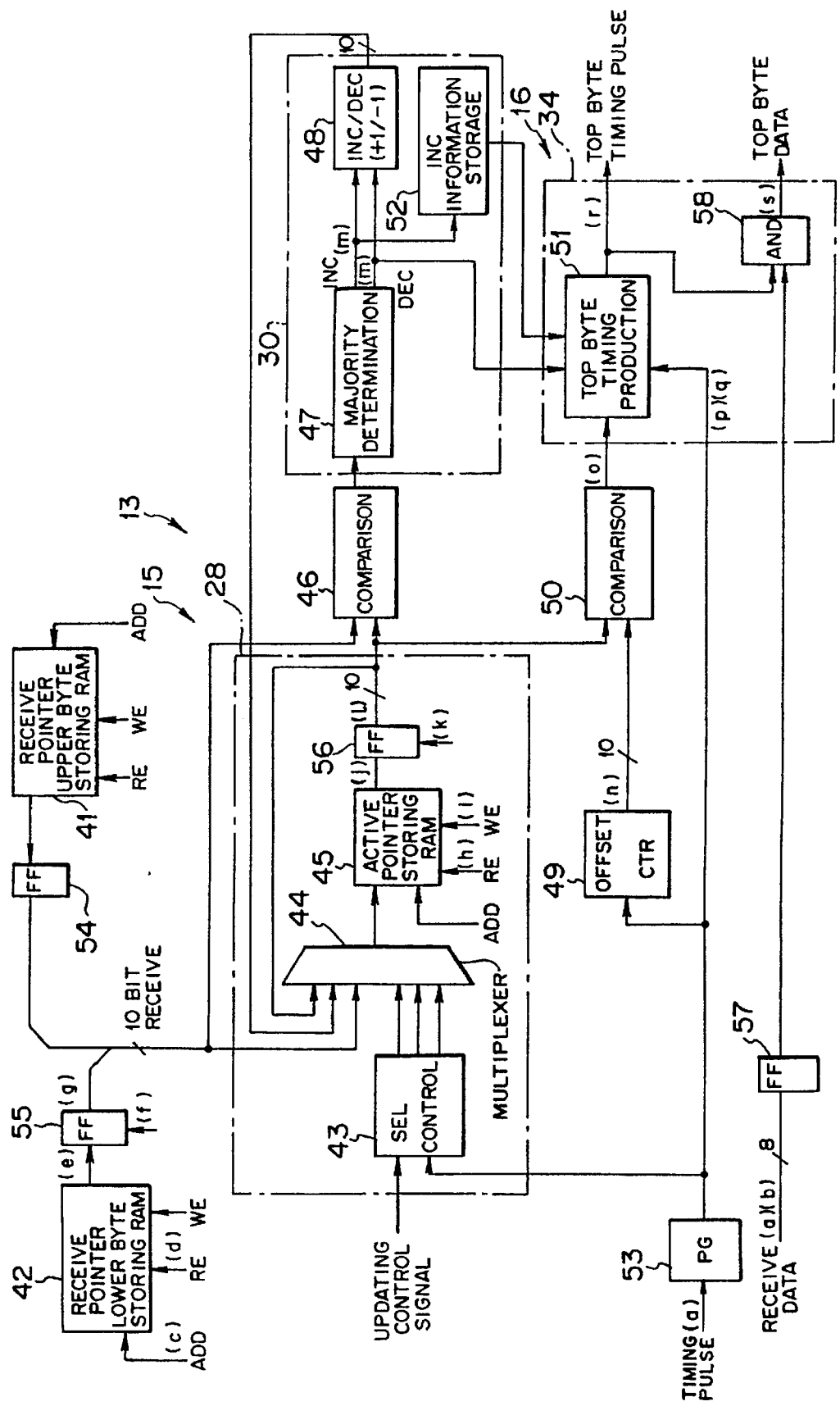
FIG. 4 is a block diagram showing a detailed construction of the pointer frame top position detection section of FIG. 3.

First, a construction of a pointer detection circuit based on the present serial processing system where it is applied to a VT (Virtual Tributary) will be described with reference to FIG. 4. Also the pointer frame top position detection section 13 shown in FIG. 4 includes a pointer detection section 15 and a top byte detection section 16. More particularly, the pointer frame top position detection section 13 includes an upper byte storing RAM 41 (which corresponds to the upper byte storage section 24), a lower byte storing RAM 42 (which corresponds to the lower byte storage section 25), a selector control section 43, a multiplexer 44, an active pointer storing RAM 45, a comparison section 46 (which corresponds to the comparison section 29), a majority determination section 47, a pointer value incrementing/decrementing section (INC/DEC section) 48, and an INC information storage section 52 as well as an offset counter 49 (which corresponds to the offset counter 32), a comparison section 50 (which corresponds to the comparison section 33), a top byte timing production section 51, an AND gate 58, a pulse generator 53 (which corresponds to the pulse generator 31), flip-flop flops 54 to 57 serving as latches for storing data, and so forth.

The selector control section 43, the multiplexer 44, the active pointer storing RAM 45 and the flip-flop 56 constitute the active pointer storage section 28, and the majority determination section 47, the INC/DEC section 48 and the INC information storage section 52 constitute the stuff control section 30.

The top byte timing production section 51 and the AND gate 58 constitute the timing production section 34.

The upper byte storing RAM 41 stores, for each of the channels, an upper byte of a receive pointer while the lower byte storing RAM 42 is provided to store, for each of the channels, a lower byte of the receive pointer. The RAMs 41 and 42 are read out at a V2 byte position and a V3 byte (Negative Stuff byte) position, respectively, each in synchronism with an address.

The receive pointers of 10 bits read out at the V2 byte position are written, when updating control of active pointer values are to be performed, into the active pointer storing RAM 45 by way of the multiplexer 44 under the control of the selector control section 43.

Meanwhile, the receive pointers of 10 bits read out at the V3 byte position are compared, by the comparison section 46, with pointer values read out from the active pointer storing RAM 45. The majority determination section 47 performs a majority determination between I bits (increment bits) and D bits (decrement bits). The INC/DEC section 48 detects INC/DEC from a result of majority determination by the majority determination section 47.

In response to the INC/DEC information detected by the INC/DEC section 48, the INC/DEC section 48 increments or decrements the active pointer value by one (+1/−1), and the new pointer values are written back into the active pointer storing RAW 45. In the meantime, a pointer value is always read out from the active pointer storing RAW 45 and is compared with a pointer offset value of the offset counter 49 so that a top byte position may be detected.

From the thus detected top byte positions, the top byte timing production section 51 makes only SPE portions effective in accordance with INC information (pointer value increment information) or DEC information (pointer value decrement information) in response to an OVER HEAD timing pulse.

By the operations described above, updating of pointer values and serial processing of stuff control can be realized.

The INC information storage section 52 stores INC information detected at a negative stuff byte position until a positive stuff byte position is reached. Where the INC information storage section 52 which constitutes a pointer value increment/decrement detection section by which it is detected at a negative stuff byte position whether a pointer value should be incremented or decremented is provided in the stuff control section 30 in this manner, raw information detected at the negative stuff byte position can be used as DEC information, and consequently, a storage section for storing such DEC information is unnecessary.

Further, since detection of an AIS is performed at the position of a V2 byte, AIS information of the upper byte storage section 24 for receive pointers shown in FIG. 3 is unnecessary at the position of a V3 byte. By storing INC information into this storage area, the INC information storage section 52 for INC information described above can be omitted. In other words, the INC information storage section 52 for INC information can be reduced by causing the storage section of the upper byte storage section 24 to function also as the INC information storage section 52.

Figure 5:
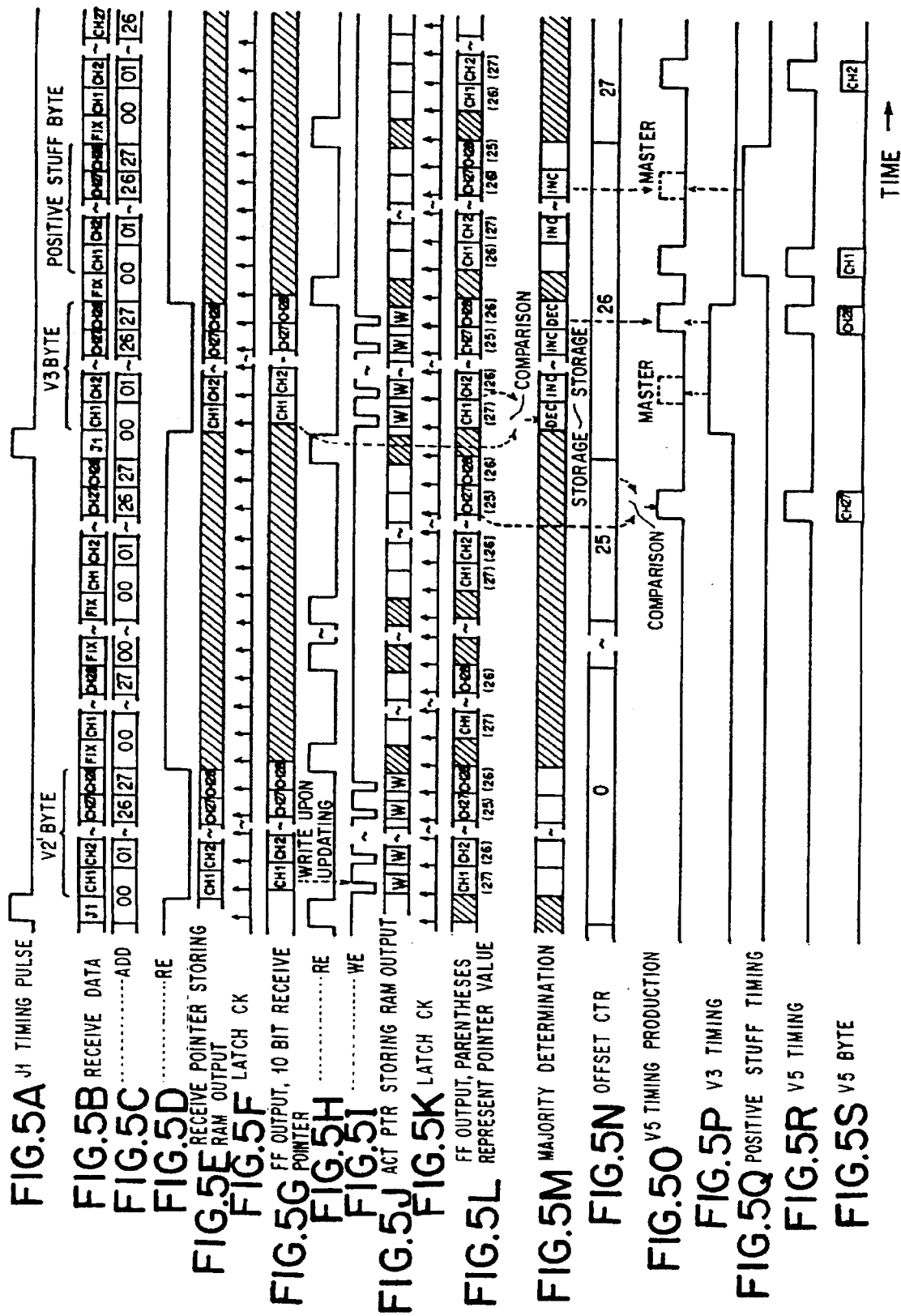
FIG. 5 is a time chart illustrating operation of the circuit shown in FIG. 4.

It is to be noted that the waveforms where the VT is 1.5 are shown at (a) to (s) in a time chart of FIG. 5. The waveforms (a) to (s) are obtained at portions indicated by reference characters (a) to (s) in FIG. 4, respectively.

c. Supervision of Line Alarms by Serial Processing

Subsequently, a procedure of supervising line alarms by serial processing will be described.

Figure 6:
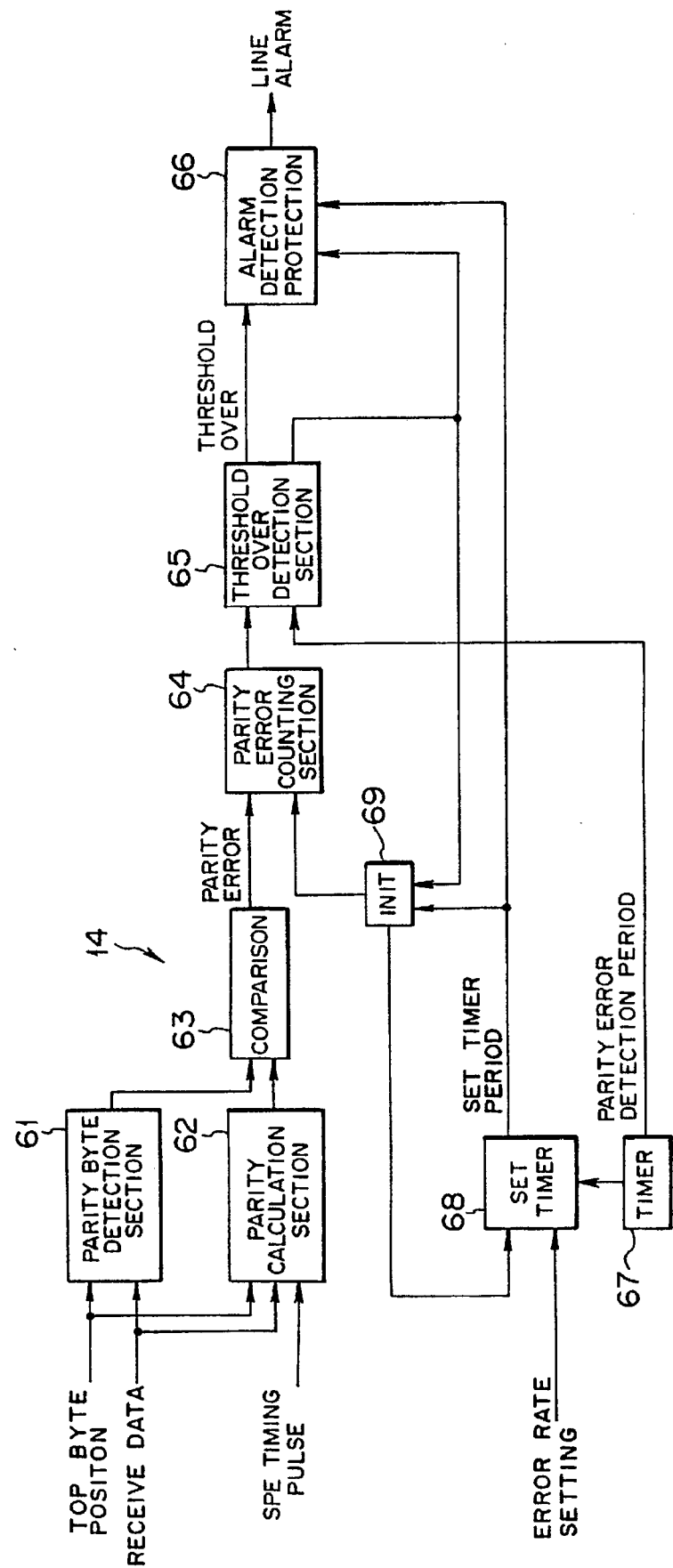
FIG. 6 is a block diagram showing a construction of an alarm detection section of the line switching apparatus of FIG. 2.

FIG. 6 shows a construction of an alarm detection section for realizing the procedure of supervising line alarms by serial processing. Referring to FIG. 6, the alarm detection section 14 shown includes a parity byte detection section 61, a parity calculation section 62, a comparison section 63, a parity error counting section 64, a threshold over detection section 65, an alarm detection protection section 66, a pair of timers 67 and 68, and an initialization pulse production section (INIT) 69.

The parity byte detection section 61 detects, for each of the channels, a parity byte on which a result of parity calculation on the transmission side is carried. The parity calculation section 62 calculates a parity of a SPE.

The comparison section 63 compares, for each of the channels, a result of parity calculation obtained by the parity calculation section 62 and a parity byte obtained by the parity byte detection section 61 with each other to detect a parity error.

The parity error counting section 64 counts, for each of the channels,parity errors obtained by the comparison section 63 for a timer period. The threshold over detection section 65 discriminates, for each of the channels, a threshold over condition of the error count value of the parity error counting section 64, that is, that the error count value reaches or exceeds a threshold value.

The alarm detection protection section 66 performs, for each of the channels, protection for a threshold over condition discriminated by the threshold over detection section 65 to detect a line alarm.

The timer 67 generates, for each of the channels, a pulse for a detection period for parity errors while the timer 68 generates, for each of the channels, a pulse for a set timer period.

The initialization pulse production section 69 produces, for each of the channels, an initialization pulse to initialize the parity error counting section 64 and the set timer 68 for each set timer period or for each detection period for parity errors when a threshold over condition is detected.

In the alarm detection section 14 having the construction described above, for each of the channels, a parity byte is detected by the parity byte detection section 61, and a parity of a SPE is calculated by the parity calculation section 62. A result of the parity calculation by the parity calculation section 62 and the parity byte detected by the parity byte detection section 61 are compared with each other by the comparison section 63 to detect a parity error.

Thereafter, such parity errors are counted for the timer period (detection period for parity errors) by the parity error counting section 64, and it is discriminated by the threshold over detection section 65 whether or not the error count value of the parity error counting section 64 reaches the threshold value.

Then, the alarm detection protection section 66 performs protection for a threshold over condition to detect a line alarm.

It is to be noted that the parity error counting section 64 and the set timer 68 are initialized in each set timer period or in each detection period for parity errors when a threshold over condition is detected for each of the channels.

In this manner, the processing sections described above serially process multiplexed data in synchronism with the addresses allocated to the individual channels of the multiplexed data.

Figure 7:
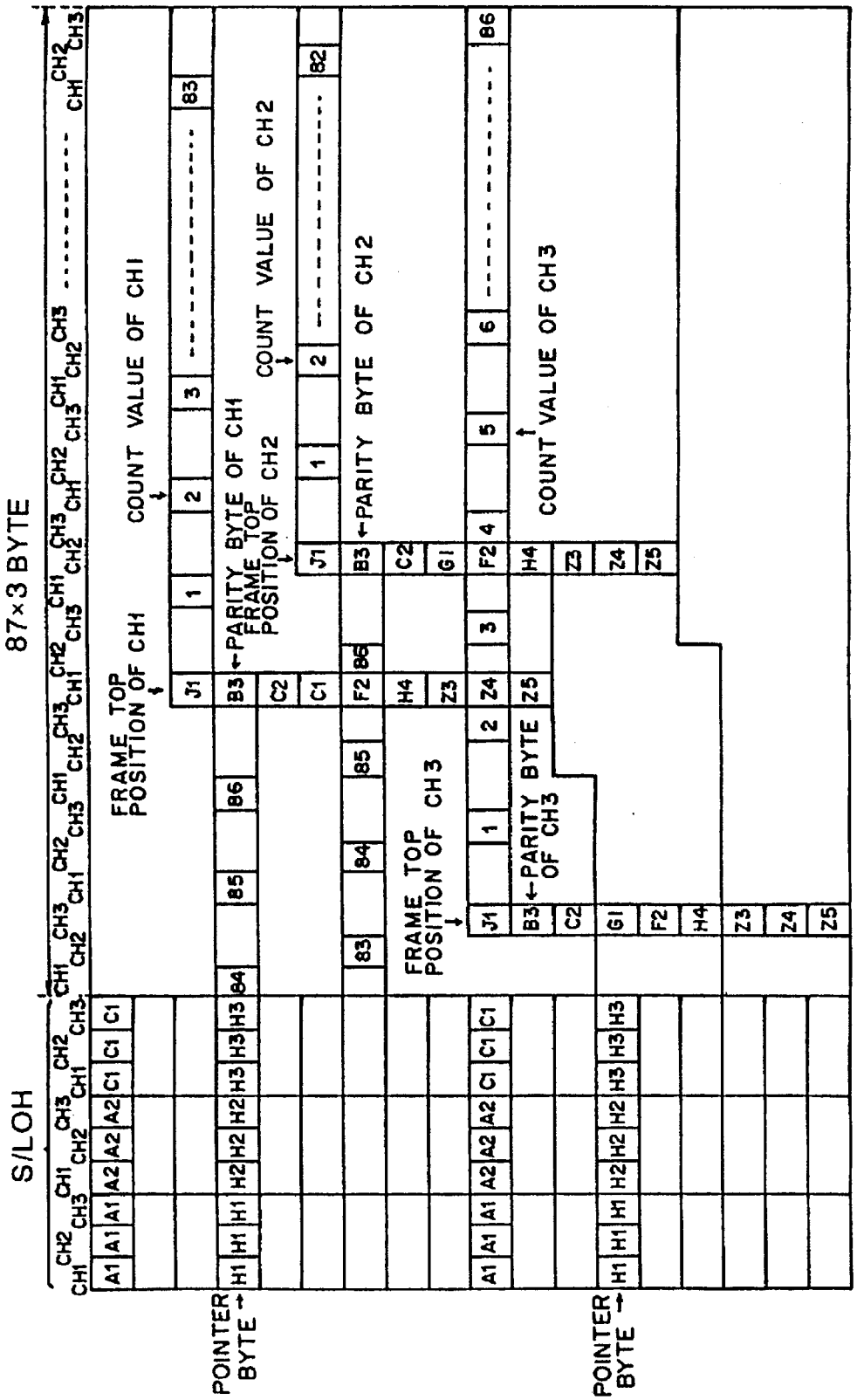
FIG. 7 is a diagrammatic view showing a construction of a frame of a STM-1.

FIG. 7 shows a construction of a frame where the STM-1 is employed. As seen from FIG. 7, for each of the channels, if a frame top byte position (J1 byte in the example shown in FIG. 7) is found, then a parity byte (B3 byte in the example shown in FIG. 7) can be detected since it is at a predetermined position. In this instance, if the J1 byte is '0' in every channel, the B3 byte is present at the 87th byte.

From the foregoing, a parity byte can be detected in any channel by counting the number of bytes from the frame top byte position to the parity byte.

Subsequently, the parity byte detection section will be described in more detail.

Figure 8:
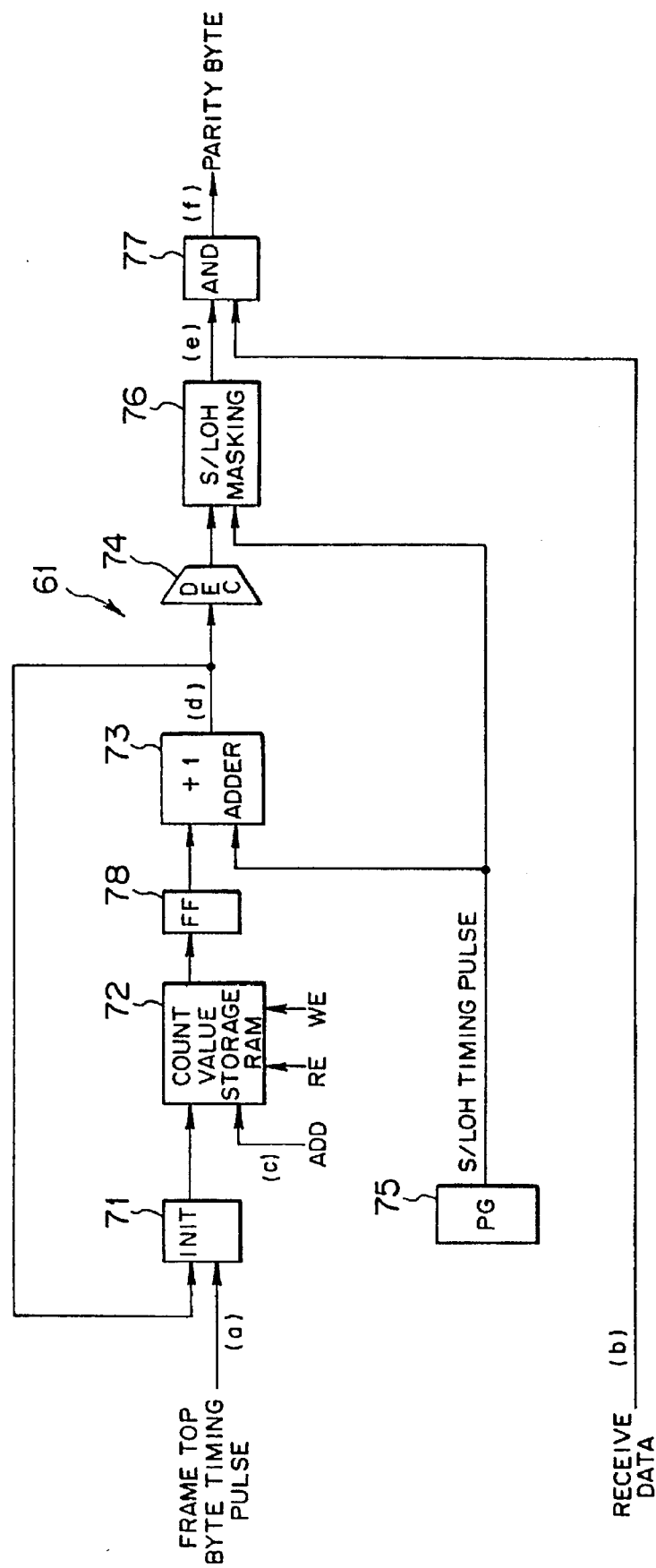
FIG. 8 is a block diagram showing a construction of a parity byte detection section of the line switching apparatus of FIG. 2.

FIG. 8 shows a construction of the parity byte detection section. Referring to FIG. 8, the parity byte detection section 61 shown includes an initialization section (INIT) 71, a count value storage RAM 72, an adder 73, a decoder (DEC) 74, a pulse generator (PG) 75, a S/LOH masking control section 76, an AND gate 77, and a flip-flop 78 serving as a latch.

The initialization section 71 initializes, for each of the channels, a count value to "0" at a frame top position. The count value storage RAM 72 stores the count values of the individual channels at the addresses allocated to the channels.

The adder 73 increments, for each of the channels, the count value by one in response to a timing pulse from the pulse generator 75. The decoder 74 decodes the count value at the position of a parity byte.

The pulse generator 75 generates a S/LOH (Section/Line Over Head) timing pulse signal. The S/LOH masking control section 76 performs masking control for a S/LOH and outputs a parity byte timing pulse signal.

The AND gate 77 takes out, for each of the channels, a parity byte from receive data in response to a signal from the S/LOH masking control section 76.

In the parity byte detection section 61 of the construction described above, in order to produce a control signal to the AND gate 77, a count value stored in the count value storage RAM 72 is incremented one by one by the adder 73, and the thus incremented count value is decoded at the position of a parity byte by the decoder 74.

Then, masking control for an S/LOH is performed by the S/LOH masking control section 75 so that a parity byte timing pulse signal is outputted as a control signal from the S/LOH masking control section 76 to the AND gate 77.

Thereafter, the AND gate 77 takes out a parity byte from the receive data in accordance with the control signal from the S/LOH masking control section 76.

In this manner, parity bytes of the individual channels can be detected in a time series relationship by serially incrementing the count values in synchronism with addresses allocated to the individual channels and opening the AND gate 77 at the timing of each parity byte.

Figure 9:
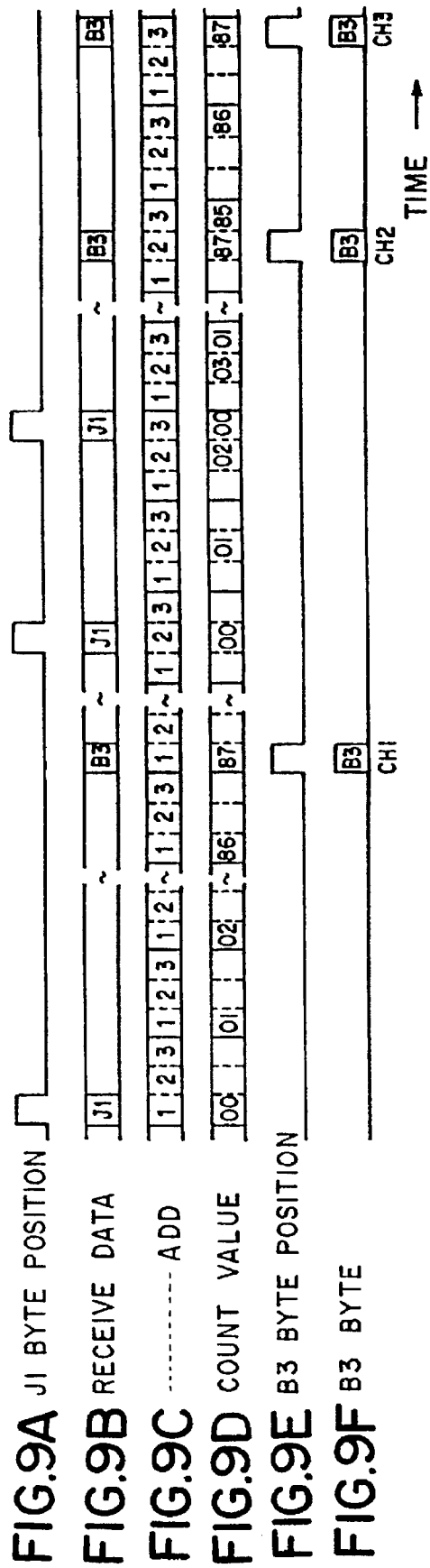
FIG. 9 is a time chart illustrating operation of the parity byte detection section shown in FIG. 8.

It is to be noted that the waveforms where the STM-1 is employed are shown at (a) to (f) in a time chart of FIG. 9. The waveforms (a) to (f) are obtained at portions indicated by reference characters (a) to (f) in FIG. 8, respectively.

Subsequently, the parity calculation section will be described in detail.

Figure 10:
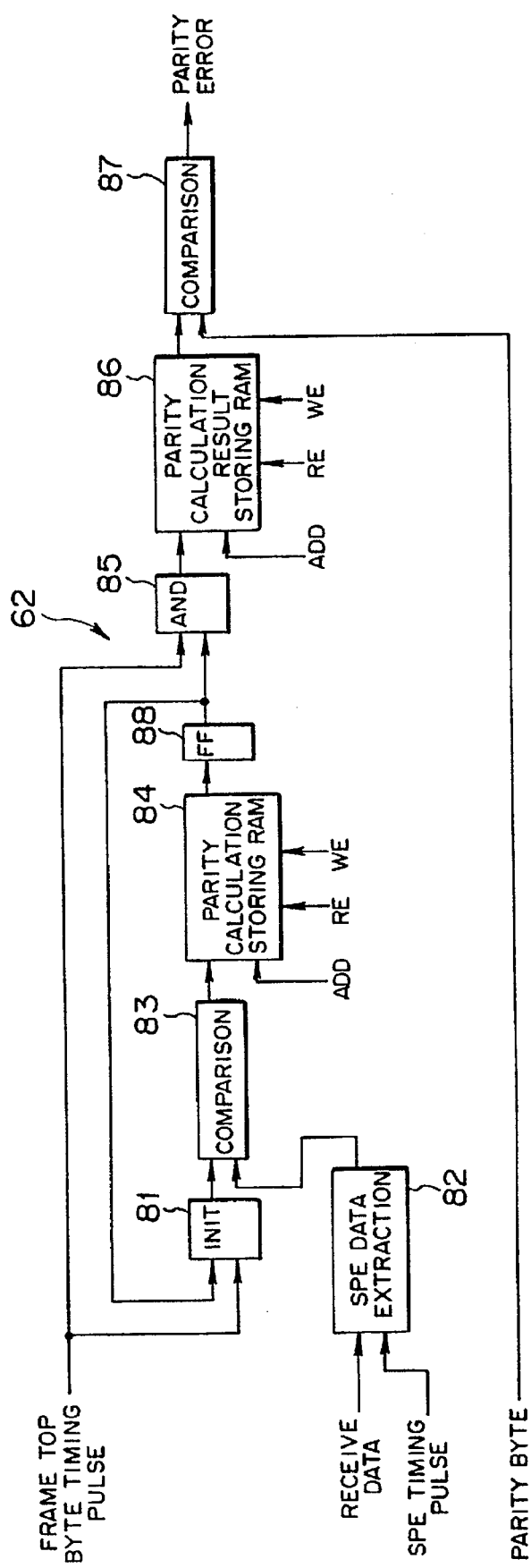
FIG. 10 is a block diagram showing a construction of a parity calculation section of the line switching apparatus of FIG. 2.

FIG. 10 shows a circuit of the parity calculation section. Referring to FIG. 10, the parity calculation section 62 shown includes an initialization section (INIT) 81, a SPE data extraction section 82, a pair of comparison sections 83 and 87, a parity calculation storing RAM 84, an AND gate 85, and a parity calculation result storing RAM 86.

The initialization section 81 performs, for each of the channels, initialization of a parity calculation starting position. Specifically, the initialization section 81 initializes, for each of the channels, a result of parity calculation of the last frame at the top position of a frame.

The SPE data extraction section 82 takes out only SPE data from receive data. The comparison section 83 compares, for each of the channels, a signal from the initialization section 81 and a signal from the SPE data extraction section 82 with each other to perform a parity calculation.

The parity calculation storing RAM 84 stores a result of calculation by the comparison section 83 for each of the channels. The AND gate 85 receives, for each of the channels, a frame top byte timing pulse and data from the parity calculation storing RAM 84 to take out a result of parity calculation within one frame.

The parity calculation result storing RAM 86 is provided to store, for each of the channels, a result of parity calculation until a parity byte position is reached. The comparison section 87 compares, for each of the channels, a result of parity calculation and a parity byte to effect parity checking. A parity error is detected as a result of comparison by the comparison section 87.

In the parity calculation section 62 of the construction described above, a result of parity calculation is stored, for each of the channels, into the parity calculation result storing RAM 86 until a parity byte position is reached, and the comparison section 87 compares the result of parity calculation with a parity byte to detect a parity error.

Thus, due to the construction described above, the processing sections can detect parity errors in a time series relationship in synchronism with addresses.

It is to be noted that, if the case wherein a parity calculation of a VT is performed with the construction described above is considered, since a parity byte of a VT SPE is at the top byte of the SPE, the parity calculation result storing RAM 86 is unnecessary.

Subsequently, detection of line alarms based on parity errors will be described.

Figure 11:
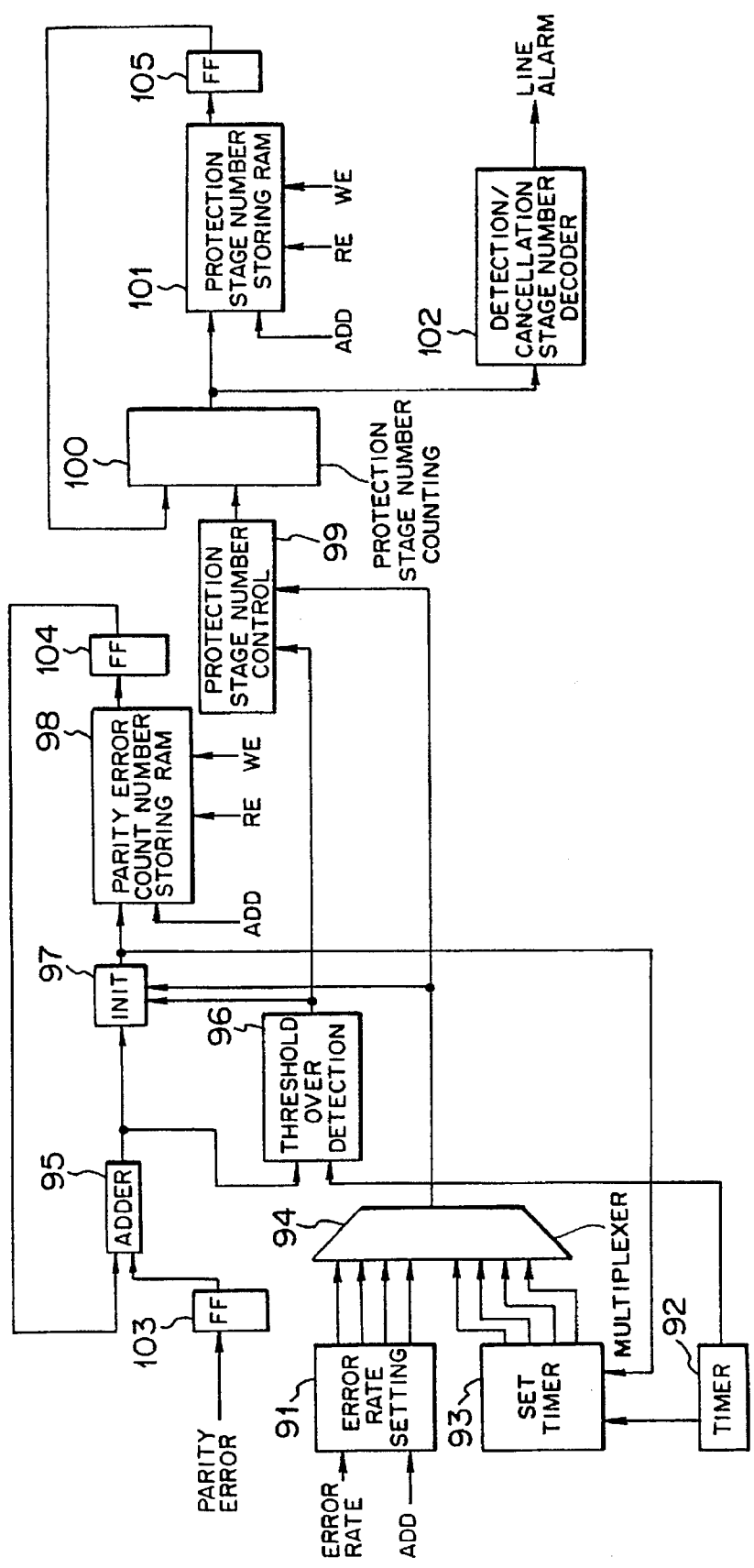
FIG. 11 is a block diagram showing a construction of essential part of the alarm detection section shown in FIG. 6.
Figure 13:
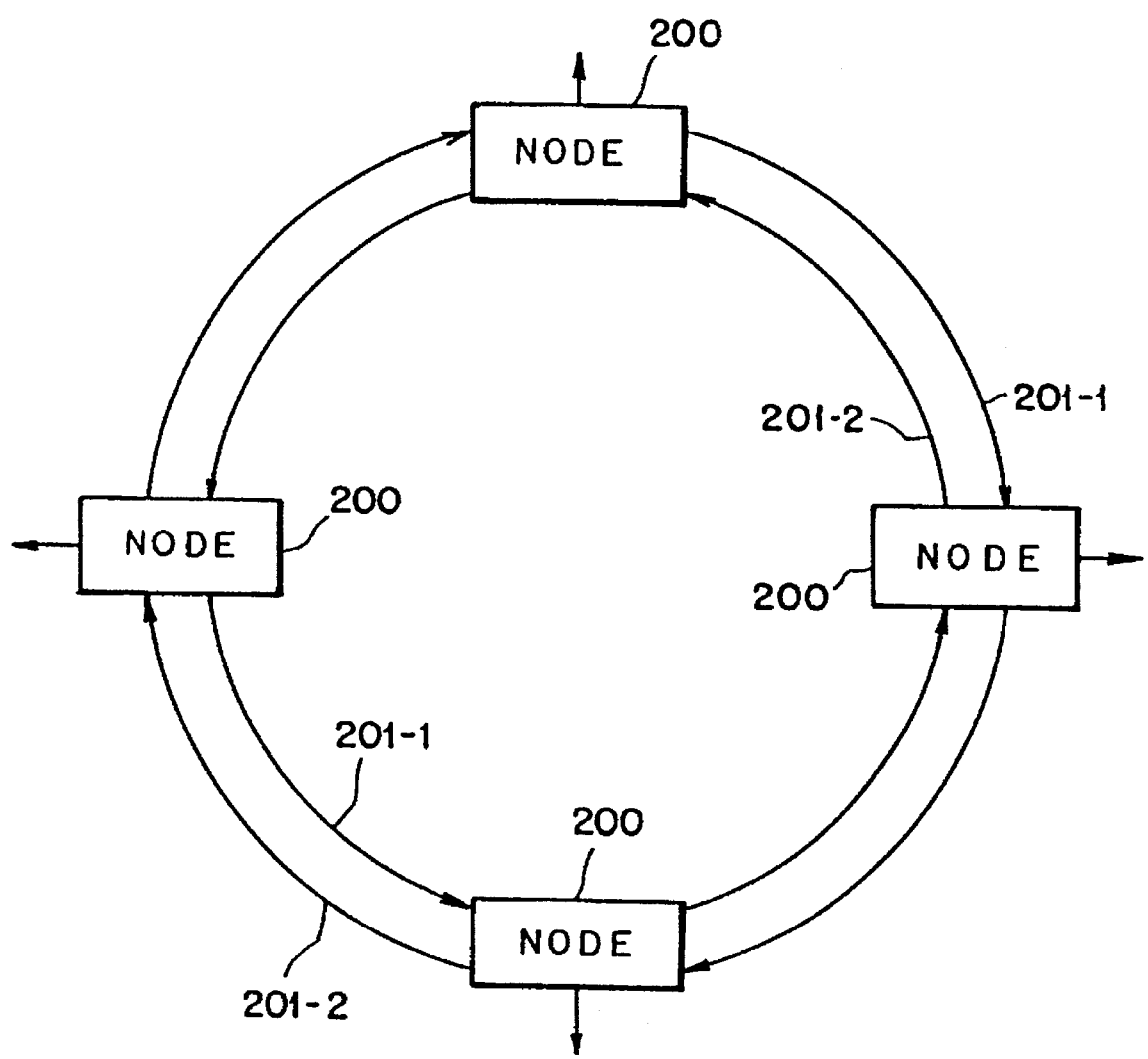
FIG. 13 is a diagrammatic view showing an exemplary time division multiplex transmission system for digital signals.

FIG. 11 shows a circuit structure for detection of line alarms based on parity errors (the circuit construction corresponds to the portion of the circuit of FIG. 6 except the parity byte detection section 61, the parity calculation section 62, the comparison section 63 and so forth). The circuit shown in FIG. 11 includes an error rate setting section 91, a pair of timers 92 and 93, a multiplexer 94, an adder 95, a threshold over detection section 96, an initialization section (INIT) 97, a parity error count number storing RAM 98, a protection stage number control section 99, a protection stage number counting section 100, a protection stage number storing RAM 101, a decoder 102, and flip-flops 103 to 105 serving as latches.

The error rate setting section 91 converts error rates set arbitrarily for the individual channels into serial data for the individual error rates in synchronism with addresses.

The timer 92 is provided to set a parity error detection period for each of the channels. The timer 93 is provided to set detection periods for the individual error rates. This allows operations for the individual channels to start from arbitrary positions in synchronism with addresses.

The multiplexer 94 takes out a timer period for a set error rate for each of the channels. By the multiplexer 94, timer period pulses are arrayed serially in synchronism with the addresses allocated to the individual channels.

The adder 95 counts the number of parity errors for each of the channels. The threshold over detection section 96 detects, for each of the channels, whether or not the number of parity errors reaches or exceeds a threshold value. The threshold over detection section 96 is supervised by the timer 92 so that, when the number of parity errors reaches or exceeds the threshold value, an alarm can be detected even if a set time period therefor does not elapse.

The initialization section 97 initializes the parity error count number storing RAM 98 and the detection period setting timer 93 for error rates in each set timer period or each time a threshold over condition is detected for each of the channels. The parity error count number storing RAM 98 stores a count number of parity errors for each parity error detection period for each of the channels.

The protection stage number control section 99 controls protection for detection of a threshold over condition for each of the channels. In particular, the protection stage number control section 99 controls the protection stage number for each of the channels so that it increases each time a threshold over condition is detected but decreases each time the set timer period elapses.

The protection stage number counting section 100 counts the number of protection stages for each of the channels. In particular, for each of the channels, the number of protection stages of the protection stage number counting section 100 is incremented or decremented by one stage from the last protection stage number condition by the protection stage number control section 99.

The protection stage number storing RAM 101 stores the number of protection stages for each of the channels. The decoder 102 decodes the number of detection/cancellation stages and outputs a line alarm for each of the channels.

In the circuit of the construction described above, the processing sections operate in a time series relationship in synchronism with an address and can array timer period pulses in synchronism with the address even at error rates set arbitrarily for the individual channels so as to perform supervision of line errors in a time series relationship.

It is to be noted that an alarm can be detected at an actual line error rate by supervising a threshold over condition by means of the timer 92 for setting a parity error detection period.

In this manner, by detecting the frame top positions of the individual channels of multiplexed transmission data by serial processing and detecting also line alarms of the individual channels serially, supervision of line qualities and switching of lines can be performed commonly for the different channels. Consequently, a transmission delay can be reduced.

Further, although low order group data usually involve a comparatively great number of channels, where the present line switching apparatus is employed, since it is required to prepare only a number of alarm detection systems equal to the number of lines, line switching at a low order group level can be realized readily. Consequently, expansion of the service to a general purpose apparatus can be achieved.

Meanwhile, upon detection of a pointer, by allocating peculiar addresses to individual channels of multiplexed data, sending out stored pointer values in a time series relationship in synchronism with the addresses and comparing the pointer values with counter values indicating offset positions of the pointers, the top byte positions can be detected in a time series relationship from arbitrary portions of SPEs to the address positions.

Further, serial processing can be realized by storing pointer values using a RAM and performing updating of the pointer values and stuff control in a time series relationship.

Meanwhile, where, upon stuff control, detection of increment (INC)/decrement (DEC) of a pointer value is performed at a negative stuff byte position, a storage section for DEC information is unnecessary, and the circuit construction can be simplified as much.

Further, where INC detection information is stored into a data storage area of a storage section for a H1 byte or a V1 byte, the circuit construction can be further reduced in size.

Meanwhile, by detecting parity bytes of the individual channels of multiplexed data in a time series relationship beginning with frame top byte positions and performing parity calculations of the individual channels of the multiplexed data in a time series relationship beginning with the frame top byte positions, parity errors can be detected in a time series relationship.

It is to be noted that, in supervision for line alarms, errors can alternatively be supervised in a time series relationship in time periods of error rates set arbitrarily for individual channels, or in supervision for line alarms, when an actual line error rate is higher than a set supervision error rate, an alarm may be detected at the actual line error rate, which is practical.

The present invention is not limited to the specifically described embodiment, and variations and modifications may be made without departing from the scope of the present invention.

What is claimed is:

1. A line switching method for switching a plurality of multiplex transmission lines in response to line alarm information in transmission data of individual channels transmitted in said multiplex transmission lines for selecting, for each of the channels, one of said multiplex transmission lines, the method comprising the steps of:

comparing, for each of said multiplex transmission lines, pointer information with pointer offset information in time series to detect frame top positions of the individual channels in the multiplexed transmission data by serial processing;

detecting, in accordance with results of detection of the frame top positions, line alarm information of the individual channels in time series by serial processing; and switching said multiplex transmission lines in a time series relationship for the individual channels in accordance with results of detection of the line alarm information for the individual multiplex transmission lines.

2. The line switching method as claimed in claim 1, wherein specific addresses are allocated to the individual channels of the multiplexed transmission data, and stored pointer values are sent out in a time series relationship in synchronism with the addresses and then compared with counter values indicating offset positions of pointers to detect the frame top positions in said time series relationship at the address positions beginning with arbitrary positions of payload envelopes.

3. The line switching method as claimed in claim 2, wherein the pointer values to be compared with the counter values are processed by stuff control to update the pointer values in a time series relationship thereby to detect the frame top positions by serial processing.

4. The line switching method as claimed in claim 3, wherein, when the stuff control is to be performed, it is detected at negative stuff byte positions whether or not the pointer values should be increased or decreased.

5. The line switching method as claimed in claim 1, wherein parity information of the individual channels of the multiplexed transmission data is detected in a time series relationship beginning with the frame top positions and parity calculations of the individual channels of the multiplexed transmission data are performed in a time series relationship beginning with the frame top positions, and from the thus obtained parity information and parity calculation information, parity error information is detected in a time series relationship to detect line alarm information of the individual channels by said serial processing.

6. The line switching method as claimed in claim 1, wherein line alarm information of the individual channels is detected in said time series relationship in timer periods of error rates set for the individual channels.

7. The line switching method as claimed in claim 6, wherein, when an actual line error rate is higher than a set supervision error rate, detection of the line alarm information is performed at the actual line error rate.

8. A line switching apparatus for switching a plurality of multiplex transmission lines in response to line alarm information in transmission data of individual channels transmitted in said multiplex transmission lines for selecting, for each of the channels, one of said multiplex transmission lines, the apparatus comprising:

a plurality of serial processing sections each provided for each of said multiplex transmission lines for detecting line alarm information of the individual channels by serial processing; and a line switching section for switching, for the individual channels, said multiplex transmission lines in a time series relationship in response to results of detection of the serial processing sections;

each of the serial processing sections including a pointer frame top position detection section for comparing pointer information with pointer offset information in time series to detect frame top positions of the individual channels in the multiplexed transmission data by serial processing, and a line alarm detection section for detecting line alarm information of the individual channels in time series by serial processing in accordance with results of detection by said pointer frame top position detection section.

9. The line switching apparatus as claimed in claim 8, wherein said pointer frame top position detection section includes a pointer detection section for detecting pointer information by serial processing, and a frame top position detection section for detecting the frame top positions of the individual channels in the multiplexed transmission data by serial processing from the pointer information detected by said pointer detection section.

10. The line switching apparatus as claimed in claim 9, wherein said pointer detection section includes a pointer value storage section for storing pointer values at specific addresses allocated to the individual channels of the multiplexed transmission data, and said frame top position detection section includes an offset counter for indicating offset positions of the pointers, and a comparison section for comparing the pointer values sent out in a time series relationship in synchronism with the addresses from said pointer value storage section with counter values from said offset counter to detect the frame top positions in said time series relationship to the address positions from arbitrary positions of payload envelopes.

11. The line switching apparatus as claimed in claim 10, wherein said pointer value storage section is constituted from a RAM, and said pointer detection section further includes a stuff control section for performing stuff control for the pointer values to be compared with the counter values, the pointer values in said pointer value storage section being updated in a time series relationship by the stuff control by said stuff control section.

12. The line switching apparatus as claimed in claim 11, wherein said stuff control section includes a pointer value increment/decrement detection section for detecting at negative stuff byte positions whether the pointer values should be incremented or decremented.

13. The line switching apparatus as claimed in claim 12, wherein a storage section for storing the pointer information serves also as a positive stuff detection information storage section for storing positive stuff detection information.

14. The line switching apparatus as claimed in claim 8, wherein said line alarm detection section includes a parity detection section for detecting parity information of the individual channels of the multiplexed transmission data from the frame top positions in a time series relationship, a parity calculation section for performing parity calculations of the individual channels of the multiplexed transmission data from the frame top positions in a time series relationship, and a parity error detection section for detecting parity error information in a time series relationship from the parity information and the parity calculation information obtained by said parity detection section and said parity calculation section, respectively, to detect line alarm information of the individual channels by serial processing.

15. The line switching apparatus as claimed in claim 8, wherein said line alarm detection section detects line alarm information of the individual channels in said time series relationship in timer periods of error rates set for the individual channels.

16. The line switching apparatus as claimed in claim 15, wherein said line alarm detection section performs, when an actual line error rate is higher than a set supervision error rate, detection of the line alarm information at the actual line error rate.

* * * * *